United States Patent
Shideleff et al.

(10) Patent No.: US 6,851,121 B1
(45) Date of Patent: Feb. 1, 2005

(54) METHOD AND APPARATUS FOR ADJUSTING AN EMBEDDED PORTION OF A TELEVISION SIGNAL

(75) Inventors: Robert William Shideleff, Newtown, PA (US); Charles Benjamin Dieterich, Kingston, NJ (US); Michael Allen Plotnick, Southampton, PA (US); Charles Weaver Christine, Hamilton, NJ (US); Elizabeth Annella Martina Seip, Somerville, NJ (US); Charles August Asmuth, Princeton, NJ (US); Kent Charles Koping, Somerset, NJ (US); Patrick Michael Sheehan, Jamison, PA (US)

(73) Assignee: Sarnoff Corporation, Princeton, NJ (US)

(*) Notice: Subject to any disclaimer, the term of this patent is extended or adjusted under 35 U.S.C. 154(b) by 618 days.

(21) Appl. No.: 09/619,333

(22) Filed: Jul. 19, 2000

(51) Int. Cl.$^7$ ............................................. H04N 7/16
(52) U.S. Cl. ........................ 725/28; 725/139; 725/151
(58) Field of Search ........................... 725/25, 27, 28, 725/31, 136, 137, 139, 151, 152, 140, 132, 131; 348/477–479, 468, 552, 465

(56) References Cited

U.S. PATENT DOCUMENTS

| | | | | |
|---|---|---|---|---|
| 5,109,279 A | * | 4/1992 | Ando | 348/564 |
| 5,638,112 A | * | 6/1997 | Bestler et al. | 725/151 |
| 6,166,780 A | * | 12/2000 | Bray | 348/632 |

* cited by examiner

Primary Examiner—John Miller
Assistant Examiner—John Manning
(74) Attorney, Agent, or Firm—William J. Burke

(57) ABSTRACT

A method and apparatus for adjusting an embedded portion of a television signal. The embedded portion is adjusted such that a downstream receiver effects no change on a displayed video upon decoding the adjusted embedded portion.

2 Claims, 3 Drawing Sheets

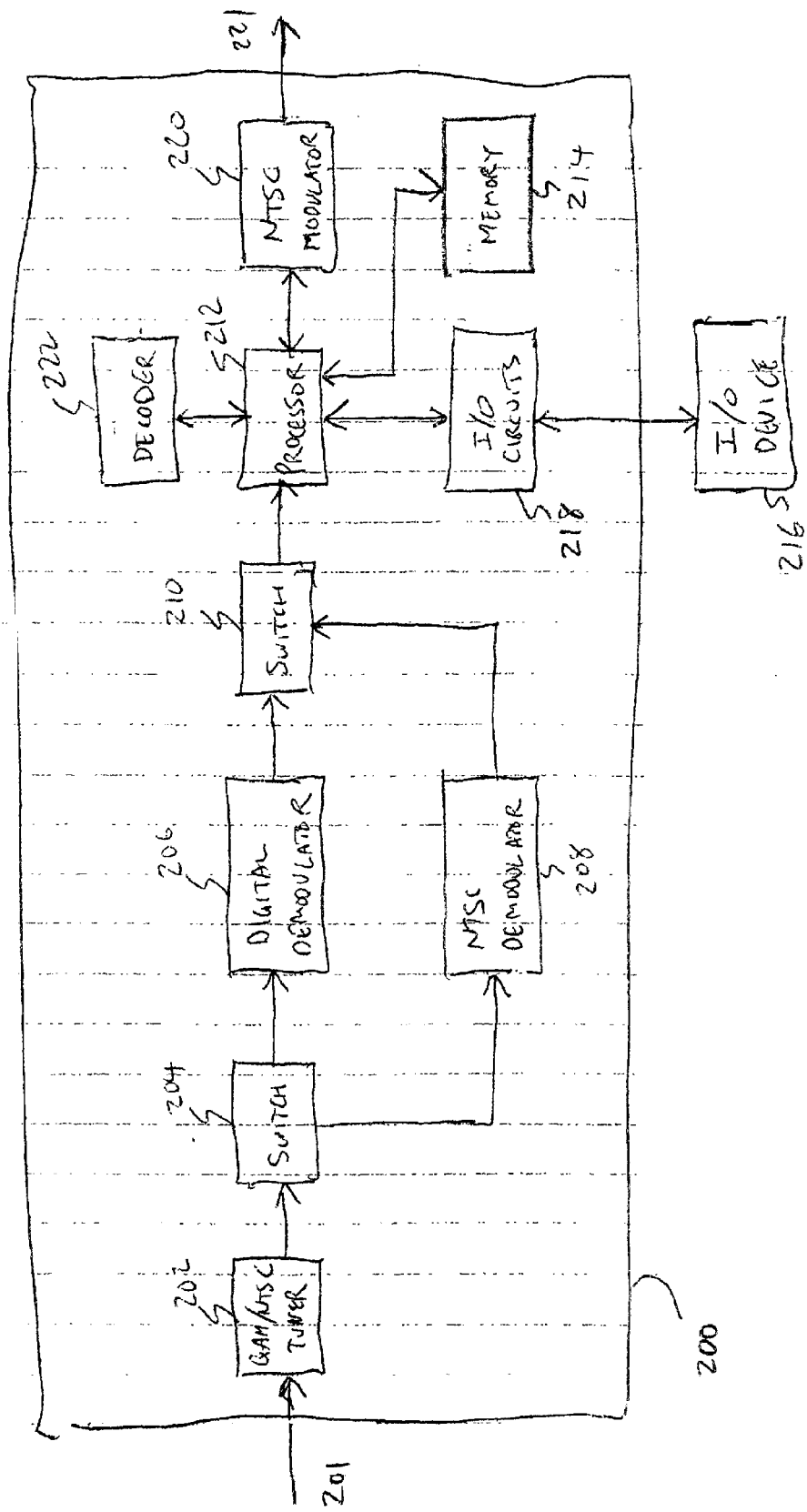

METHOD AND APPARATUS FOR ADJUSTING AN EMBEDDED PORTION OF A TELEVISION SIGNAL

The present invention relates to the adjustment of embedded information in a television signal. More specifically, the invention relates to a method and apparatus for preventing conflicts when a television receiver and set top terminal are each capable of processing embedded information, e.g., line 21 video information, in the television signal.

BACKGROUND OF THE DISCLOSURE

FIG. 1 depicts a system level diagram of a television system 100. A typical configuration of the television system 100 comprises a signal source 110, a set top terminal 120 and a television receiver 130. The signal source 110 provides a television signal, e.g., a National Television Standard Committee (NTSC) television signal or a high definition television (HDTV) signal, for use in the television system 100. Examples of such video sources 110 may include an antenna for producing "over-the-air" television signals, a cable carrying cable television signals or a satellite receiver for generating satellite television signals.

The set top terminal 120 receives the television signal from the signal source 110. If the received television signal is RF or IF, the set top terminal 120 may convert the video and audio portions of the received television signal into baseband signals. The set top terminal 120 processes the video and audio components of the television signal into a suitable format, e.g., NTSC format, for display on the television receiver 130. Examples of set top terminals 120 may include a cable box, a video cassette recorder (VCR), or an Advanced Television Systems Committee (ATSC) legacy converter box.

The television receiver 130 processes the television signal, e.g., a NTSC signal, to display standard video and audio programmed content. Recent versions of the television receiver 130 may provide closed caption information pursuant to the Television Decoder Circuitry Act of 1990 and V-chip rating control pursuant to the Telecommunications Act of 1996. As such, the television receiver 130 may decode and display information embedded, e.g., line 21 information, in the television signal. In this case, the set top terminal 120 generally passes the television signal from the signal source 110 to the television receiver 130.

However, the set top terminal 120 is also capable of decoding and processing the television signal for display on the television receiver 130. This processing is normally performed where the television receiver 130 is a legacy television incapable of independently decoding embedded information in the television signal. In this case, only the set top terminal 120 may process embedded information used to provide closed captioning and filter video content.

A problem exists if both the set top terminal 120 and television receiver 130 decode and process the television signal for display. As the set top terminal 120 and television receiver may independently process embedded information for display, conflicts between the set top terminal 120 and television receiver 130 may arise. In one example, both the set top terminal 120 and television receiver 130 may provide separate closed caption displays over the displayed video. If the closed caption displays are not placed with identical positions and identical fonts from the set top terminal 120 and television receiver 130, then these closed caption displays will overlap, thereby creating a confusing display.

In another example, the set top terminal 120 and television receiver 130 perform block or pass program content based on V-chip information. For example, a set top terminal 120 may pass or allow program content that is then blocked by a downstream television receiver 130. Since only the display from the downstream television receiver 130, i.e., the device blocking the program, is shown, the viewer loses feedback from the tuning device, i.e., the set top terminal 120. Moreover, if the television system 100 comprises multiple set top terminals 120, e.g., a cable box and a VCR, it would be difficult to determine which set top terminal 120 is actually blocking the program content.

In another example, the set top terminal 120, e.g., a VCR, may record a program with a time index or timestamp typically embedded in line 21 of the television signal. As a downstream set top terminal 120 or television receiver 130 utilizes this timestamp to set a display clock. As such, when the television signal is played back at a later time, the playing device would provide erroneous time information.

Therefore, a need exists in the art for eliminating the display conflicts between the set top terminal and the television receiver.

SUMMARY OF THE INVENTION

The present invention overcomes the disadvantages associated with the prior art by providing a method and apparatus that adjusts the embedded portion of a received television signal. Specifically, the invention receives a television signal having an embedded portion, detects the embedded portion, and adjusts the embedded portion. The adjustment is performed such that a downstream receiver effects no change on a displayed video upon decoding the adjusted embedded portion. Such embedded information may comprise line 21 information such as closed captioning, V-chip rating or timestamp information. In one embodiment of the invention, a set top terminal may adjust the embedded portion such that a downstream television receiver may not affect changes to a displayed video. In this case, only the set top terminal may effect changes on the displayed video upon decoding the embedded portion.

BRIEF DESCRIPTION OF THE DRAWINGS

The teachings of the present invention can be readily understood by considering the following detailed description in conjunction with the accompanying drawings, in which:

FIG. 1 depicts a high level block diagram of a television system;

FIG. 2 depicts a block diagram of a set top terminal in the television system of FIG. 1;

DETAILED DESCRIPTION

Figure 3:
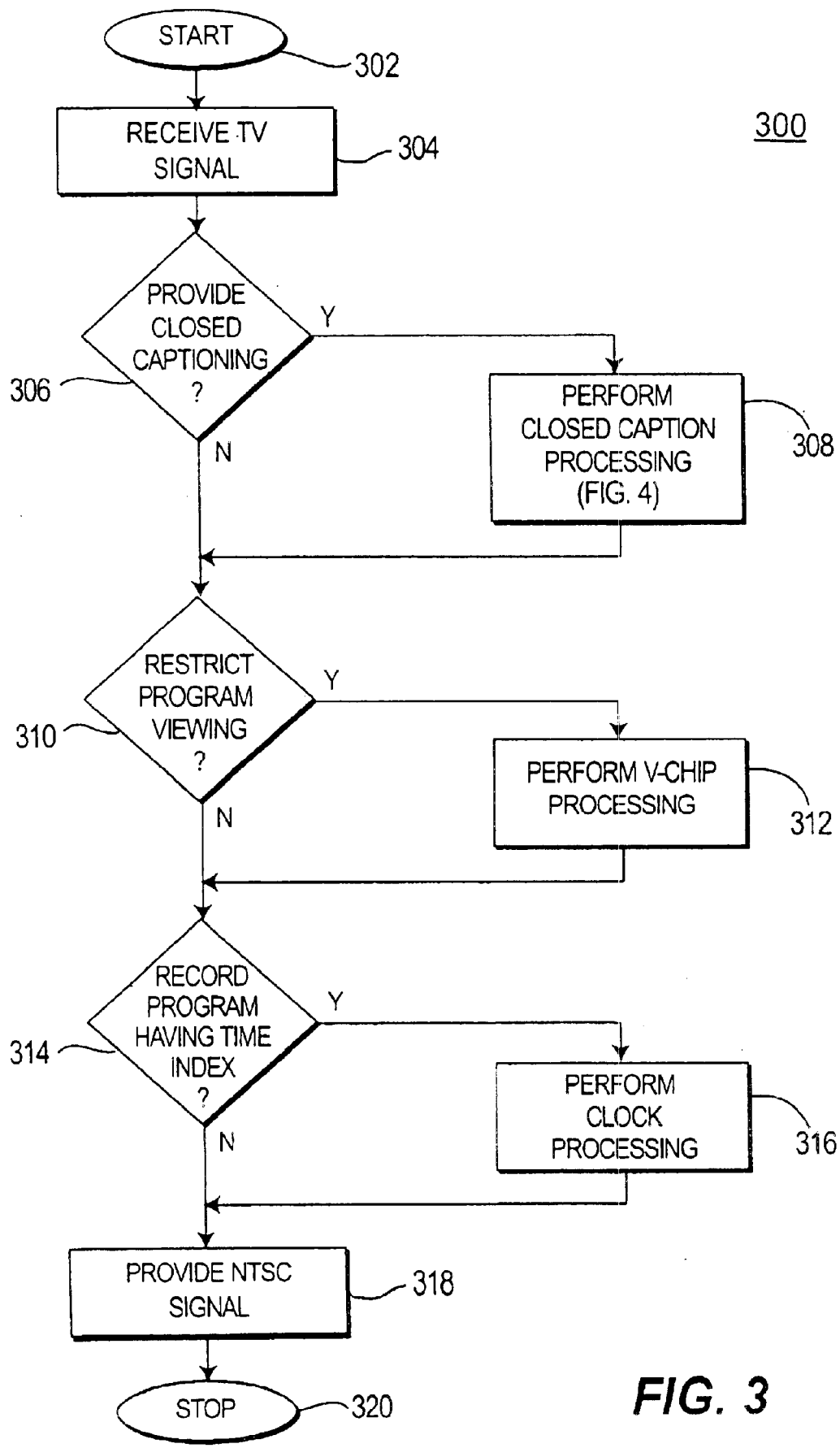
FIG. 3 depicts a flow diagram for implementing a processing routine of the present invention.

Although the present invention is described in the context of a television system comprising a receiver and set top terminal, the present invention also applies to any system having two or more receivers capable of processing embedded information in a signal.

FIG. 2 depicts a block diagram of a set top terminal 200 in the television system of FIG. 1. The set top terminal 200 may comprise any terminal that receives a television signal via path 201, processes the television signal and provides the processed television signal to a television via path 221. An example of the set top terminal 200 is provided in U.S. patent application Ser. No. 08/950, 505, filed on Sep. 16, 1997, and entitled "Set Top Terminal for an Interactive Information Distribution System," which is herein incorporated by reference in its entirety.

Specifically, the set top terminal 200 comprises a tuner 202, a first switch 204, a digital demodulator 206, an analog demodulator 208, a second switch 210, a processor 212, a memory 214, input/output (I/O) circuits 218, a National Television Standard Committee (NTSC) modulator 220, and a decoder 222. In one embodiment of the invention, the tuner 202 receives a radio frequency (RF) television signal from the signal source, e.g., an antenna, and downconverts the RF television signal into an intermediate frequency (IF) television signal.

The first switch 204 couples the IF television signal from the tuner 202 to either the digital demodulator 206 or the analog demodulator 208, e.g., a NTSC demodulator. Namely, the first switch 204 routes the IF television signal to the proper demodulator. The digital demodulator 206 converts a digital IF television signal into a digital baseband television signal. Similarly, the analog demodulator 208 converts an analog IF television signal into an analog baseband television signal. The second switch 210 couples the digital or analog baseband television signal to the processor 212.

The baseband television signal is coupled to the processor 212 and the decoder 222. The processor 212 executes a software program to perform the required processing for overcoming the problems of the prior art. Specifically, the processor 212 executes a software program to implement a method 300 embodied in FIG. 3 as described below. The software program is stored in memory 214, e.g., read only memory (ROM), solid state memory, optical memory and the like. A viewer may use input/output (I/O) devices 216 to control features or settings, e.g., closed captioning, blockage of selected program content, of the set top terminal 200. In the context of a television system 100, the I/O device 216 may comprise an input device, e.g., a remote control, or an output device, e.g., a display device or monitor. The I/O circuits 218 provide an interface between the processor 212 and one or more I/O devices 216.

Upon executing the software program, the processor 212 adjusts the embedded portion, e.g., the line 21 information, of the baseband television signal. In one embodiment of the invention, the closed captioning information may be removed from the line 21 information. In another embodiment, the V-chip rating may be removed or adjusted to a rating, e.g., a G rating, which is always passed by a downstream television 130. The timestamp in the embedded information may be removed as well. The adjusted television signal is coupled to a NTSC modulator, where the adjusted baseband television signal is modulated into a NTSC television signal. This NTSC television signal is coupled to a downstream television receiver via path 221. In this manner, the television receiver is prevented from processing the embedded portion of the television signal. As such, since only the set top terminal 200 processes the embedded portion of the television signal, the prior art problem is thereby eliminated.

In one embodiment of the invention, the processor 212 extracts the embedded portion of the baseband television signal. The decoder 222 decodes the extracted signal, e.g., the embedded portion of the baseband television signal, to generate graphics information, e.g., open caption information. The graphics information is applied to the NTSC modulator 220, where an image having integrated graphics is created. The NTSC modulated television signal is transmitted to a downstream receiver, e.g., a television receiver.

The present invention may also be implemented as a program product for use with the television system 100. The program(s) of the program product defines functions that can be contained on a variety of signal/bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent additional embodiments of the present invention.

FIG. 3 depicts flow diagram for implementing a method 300 of the present invention. The method 300 starts at step 302 and proceeds to receive the baseband television signal at step 304. Prior conversions of the television signal, i.e., conversion to RF to IF to baseband, are performed in a standard manner and are not discussed within the context of this method 300.

At step 306, the method 300 determines whether to provide closed captioning. If closed caption is desired, then the method 300 proceeds to step 308, where closed caption processing is performed. Step 308 is embodied in a method 400 in FIG. 4.

Figure 4:
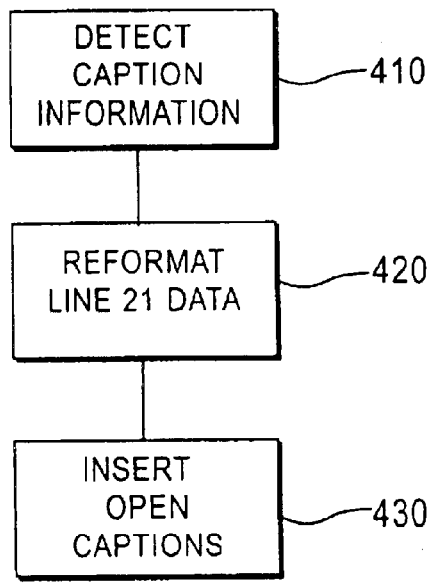
FIG. 4 depicts a portion of the processing routine in a first embodiment of the present invention.

FIG. 4 depicts a flow diagram of the method 400 to implement a first embodiment of the present invention. The method 400 proceeds to step 410, where closed caption information is detected within the television signal. The closed caption information represents information that is embedded within the television signal, e.g., line 21 information of a NTSC television signal or line 22 of a Phase Alternate Line (PAL) television signal. Closed caption information is typically provided in analog television signals in accordance with EIA-608 (EIA: Electronic Industries Alliance) standard and provided in digital television signals, e.g., a HDTV signal, in accordance with EIA-708.

At step 420, the method 400 reformats, e.g., removes, the portion of the television signal corresponding to the closed-caption information. In one embodiment of the invention, step 420 removes the closed caption information from the line 21 information of the NTSC television signal. In this matter, the television receiver or another downstream set top terminal can no longer process the closed caption information removed from the television signal. As such, only closed caption information from the set top terminal is displayed. Step 420 can also remove the closed caption information in a selective manner, i.e., the closed caption information can be always removed or only when the set top terminal is used to display closed caption information.

The method 400 proceeds to step 430, where the set top terminal200 applies the open captions, i.e., the embedded portion of the television signal that is decoded, to the video. More specifically, the detected closed caption information is extracted from the television signal, decoded into open caption graphics, and applied to the video. In this matter, the open caption is integrated into the video of the television signal and the embedded portion is reformatted. This television signal is sent downstream to a receiver, e.g., a television receiver.

Returning to FIG. 3, after performing closed caption processing at step 308, the method 300 proceeds to step 310. If closed captioning is not desired at step 306, the method directly proceeds to step 310. At step 310, the method 300 determines whether to restrict program viewing. If program viewing is to be restricted, the method 300 proceeds step 312, where V-chip processing is performed. Step 312 is embodied in a method 500 depicted in FIG. 5.

Figure 5:
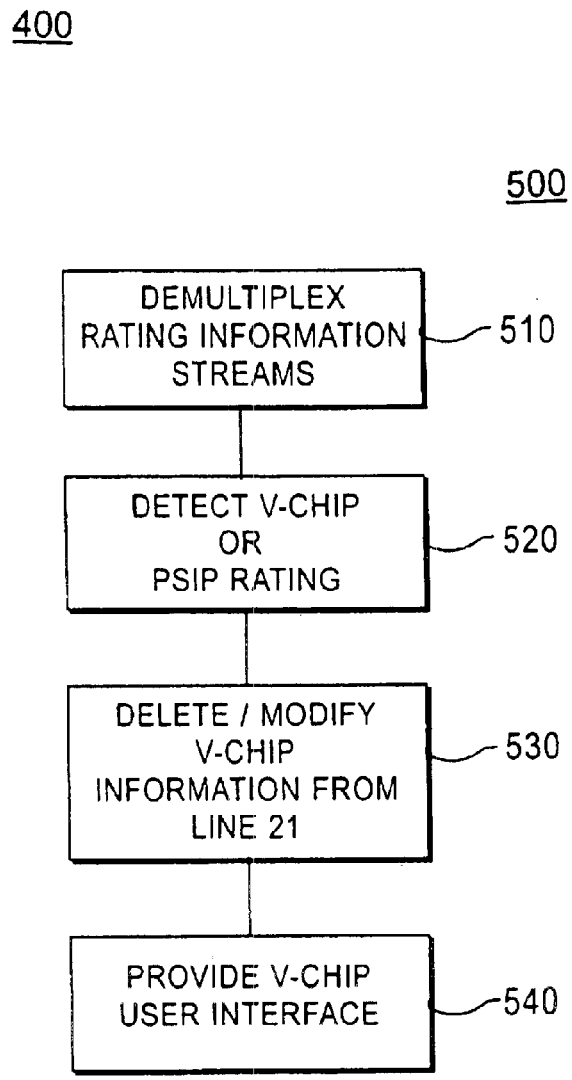
FIG. 5 depicts a portion of the processing routine in a second embodiment of the present invention.

FIG. 5 depicts a flow diagram of a method 500 to implement a second embodiment of the present invention. As with closed captioning information, V-chip rating information is typically provided in line 21 of the television signal. The V-chip ratings are generally provided in an NTSC television signal in accordance with, for example, EIA-744A. In an Advanced Television Systems Committee (ATSC) television signal, the V-chip rating information is provided in accordance to a Program and System Information Protocol (PSIP).

The method 600 starts at step 510, where rating information streams are demultiplexed from the television signal. At step 520, the V-chip rating information is detected from the television signal. The method 500 proceeds to step 530, where the portion of the television signal corresponding to the V-chip rating information is reformatted, e.g., deleted or modified. After modifying the V-chip information, the method proceeds to provide a V-chip user interface on the display device. In one mode of operation, if a viewer desires to pass a particular rated program, the set top terminal would delete the V-chip information or modify the V-chip information to a general pass mode by modifying the V-chip information to a universally unblocked rating. In this case, the downstream receiver, e.g., a television receiver, is precluded from blocking the television program. That is, the set top terminal 200 controls the program viewability.

Returning to FIG. 3, after performing V-chip processing at step 312, the method 300 proceeds to step 314. If program viewing is not to be restricted at step 310, the method 300 directly proceeds to step 314. At step 314, the method 300 determines whether to record program content having a time stamp or time index. If program content having timing information is to be recorded, the method 300 proceeds step 316, where clock processing is performed. Step 316 is embodied in a method 600 depicted in FIG. 6.

Figure 6:
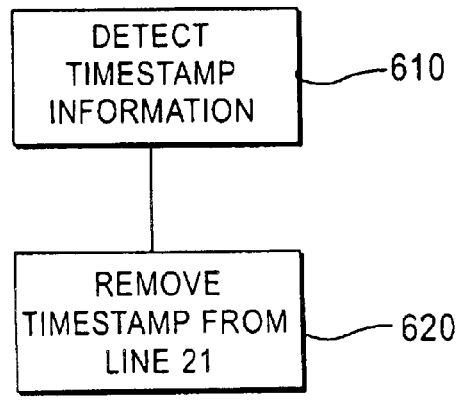
FIG. 6 depicts a portion of the processing routine in a third embodiment of the present invention.

FIG. 6 depicts a flow diagram of a method 600 to implement a third embodiment of the present invention. The method 600 starts at step 610, where timestamp information is detected in the television signal. Such information may be embedded in the line 21 information when a VCR records a program. At step 620, the method 600 proceeds to remove the detected timestamp information. In this manner, a downstream device, e.g., a television receiver, is prevented from using this timestamp information in setting its display clock once the program is played back at a later time.

Returning to FIG. 3, after performing clock processing at step 316, the method 300 proceeds to step 318. If program content having timing information is not to be recorded, the method 300 directly proceeds to step 318. At step 318, the method 300 provides a signal, e.g., an adjusted NTSC television signal. Such a processed signal prevents the downstream television receiver from conflicting with information generated directly from the set top terminal 200.

Although various embodiments which incorporate the teachings of the present invention have been shown and described in detail herein, those skilled in the art can readily devise many other varied embodiments that still incorporate these teachings.

What is claimed is:

1. Method for adjusting an embedded portion of a television signal comprising:
    receiving the television signal having the embedded portion, wherein the embedded portion comprises V-chip rating information;
    detecting the embedded portion of the television signal; and
    adjusting the embedded portion, where a downstream receiver is prevented from processing the adjusted embedded portion, wherein said adjusting step comprises:
        determining whether to block the television signal based on the identified V-chip rating information; and
        modifying the identified V-chip rating information to a universally unblocked rating if said determining is to pass the television signal.

2. Method for adjusting an embedded portion of a television signal comprising:
    receiving the television signal having the embedded portion, wherein the embedded portion comprises V-chip rating information;
    detecting the embedded portion of the television signal; and
    adjusting the embedded portion, where a downstream receiver is prevented from processing the adjusted embedded portion, wherein said adjusting step comprises:
        determining whether to block the television signal based on the identified V-chip rating information; and
        modifying the identified V-chip rating information to a universally blocked rating if said determining is to block the television signal.

* * * * *

UNITED STATES PATENT AND TRADEMARK OFFICE
CERTIFICATE OF CORRECTION

PATENT NO. : 6,851,121 B1
DATED : February 1, 2005
INVENTOR(S) : Shideleff et al.

It is certified that error appears in the above-identified patent and that said Letters Patent is hereby corrected as shown below:

Column 1,
Line 4, below "TELEVISION SIGNAL" insert -- This non-provisional U.S. national application, filed under 35 U.S.C. § 111(a) claims, under 35 U.S.C. § 119 (e) (1), the benefit of the filing date of provisional U.S. application no. 60/161,647, filed under 35 U.S.C. § 111 (b) on October 27, 1999. --.

Column 5,
Line 22, delete "600" and insert -- 500 --, therefor.

Signed and Sealed this

Twelfth Day of July, 2005

JON W. DUDAS
*Director of the United States Patent and Trademark Office*